(12) United States Patent  
Luo et al.

(10) Patent No.: US 7,639,947 B2
(45) Date of Patent: Dec. 29, 2009

(54) SYSTEM AND METHODS FOR QUANTUM KEY DISTRIBUTION OVER WDM LINKS

(75) Inventors: Yuhui Luo, Hunan Province (CN); Kam Tai Chan, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 487 days.

(21) Appl. No.: 11/231,084

(22) Filed: Sep. 19, 2005

(65) Prior Publication Data

US 2007/0065155 A1    Mar. 22, 2007

(51) Int. Cl.
H04J 14/02 (2006.01)
H04B 10/00 (2006.01)
H04K 1/00 (2006.01)
H04L 9/08 (2006.01)
H04L 9/32 (2006.01)

(52) U.S. Cl. ............... 398/89; 398/79; 398/151; 380/256; 380/278; 713/171

(58) Field of Classification Search ............ 398/78, 398/89, 151; 380/256, 278; 713/171
See application file for complete search history.

(56) References Cited

U.S. PATENT DOCUMENTS

| 5,515,438 | A | 5/1996 | Bennett et al. | |
|---|---|---|---|---|
| 7,113,598 | B2 | 9/2006 | Flusberg et al. | |
| 7,130,045 | B2* | 10/2006 | Popov | 356/331 |
| 2005/0100351 | A1 | 5/2005 | Yuan et al. | |
| 2005/0135627 | A1* | 6/2005 | Zavriyev et al. | 380/278 |
| 2005/0180575 | A1* | 8/2005 | Maeda et al. | 380/278 |
| 2006/0018475 | A1* | 1/2006 | Vig et al. | 380/256 |
| 2006/0045527 | A1* | 3/2006 | Maeda et al. | 398/79 |
| 2006/0210083 | A1* | 9/2006 | Takemoto et al. | 380/278 |
| 2006/0263096 | A1 | 11/2006 | Dinu et al. | |

FOREIGN PATENT DOCUMENTS

CN    1614918    5/2005

OTHER PUBLICATIONS

Compatibility of quantum key distribution with optical networking; Chapuran et al.; Proc. SPIE, vol. 5815, 164 (2005). DOI:10.1117/12.603640; Conference Date: Tuesday Mar. 29, 2005.*

(Continued)

Primary Examiner—Nathan M Curs
(74) Attorney, Agent, or Firm—Darby & Darby P.C.

(57) ABSTRACT

A system and a method for quantum key distribution between a transmitter and a receiver over wavelength division multiplexing (WDM) link are disclosed. The method includes providing one or more quantum channels and one or more conventional channels over the WDM link; assigning a different wavelength to each of the one or more quantum channels and each of the one or more conventional channels; transmitting single photon signals on each of the one or more quantum channels; and transmitting data on each of the one or more conventional channels. The data comprises either conventional data or trigger signals for synchronizing the transmission of the single photon signals on the quantum channels. All channels have wavelengths around 1550 nm. The WDM link can be a 3-channel WDM link comprising two quantum channels for transmitting single photon signals and one conventional channel for transmitting conventional data or triggering signals.

23 Claims, 7 Drawing Sheets

OTHER PUBLICATIONS

Miller et al. Optical Communications Rules of Thumb. N. Y., McGraw-Hill, 2003. p. 235-236.*

International Search Report dated Nov. 9, 2006 issued for corresponding International Patent Application No. PCT/CN2006/001816.

Silva et al., "A Dense WDM Source Using Optical Frequency Comb Generation and Widely Tunable Injection-Locked Laser Filtering Techniques," IEE PREP 2000 Conference on Postgraduate Research in Electronics, Photonics and Related Fields, pp. 497-500, Nottingham, UK, Apr. 2000.

Nweke et al., "Experimental Characterization of Wavelength Separation for "QKD+WDM" Co-Existence," Lasers and Electro-Optics, 2005 (CLEO), 2(22-27):1503-1505, May 2005.

* cited by examiner

SYSTEM AND METHODS FOR QUANTUM KEY DISTRIBUTION OVER WDM LINKS

FIELD OF THE INVENTION

The present invention relates to a communication system and a method for communicating encrypted data. In particular, the present invention relates to the technique known as quantum key distribution over wavelength division multiplexing (WDM) links.

TECHNICAL BACKGROUND OF THE INVENTION

The purpose of cryptography is to exchange messages in perfect privacy between a transmitter and a receiver by using a secret random bit sequence known as a key. Once the key is established, subsequent messages can be transmitted safely over a conventional channel. For this reason, secure key distribution is a fundamental issue in cryptography. Unfortunately, the conventional cryptography provides no tools to guarantee the security of the key distribution because, in principle, classical signals can be monitored passively. The transmitter and receiver have no idea when the eavesdropping has taken place.

However, secure key distribution is possibly realized by using the technology of quantum key distribution (QKD). Quantum key distribution is believed to be a natural candidate to substitute conventional key distribution because it can provide ultimate security by the uncertainty principle of quantum mechanics, namely, any eavesdropping activities made by an eavesdropper will inevitably modify the quantum state of this system. Therefore, although an eavesdropper can get information out of a quantum channel by a measurement, the transmitter and the receiver will detect the eavesdropping and hence can change the key.

A variety of systems for carrying out QKD over an optical fiber system have been developed. Quantum cryptography has already been applied to the point-to-point distribution of quantum keys between two users. As shown in FIG. 1, quantum cryptography system in the prior art employs two distinct links. Of them, one is used for transmission of a quantum key by an optical fiber, while the other carries all data by internet or another optical fiber.

However, it is desirable to apply quantum cryptography in currently deployed commercial optical network. Yet only several studies on quantum key distribution over 1,300 nm network have been reported to date. One problem of the reported system is that it is difficult to transmit signals over a long distance at 1,300 nm in standard single mode fibers. Thus, quantum key distribution with wavelengths around 1,550 nm over the long distance is preferred. In addition, it is considered that no strong signals (e.g. conventional data) should exist in network with quantum channels or that a large spacing of wavelengths between a quantum channel and a conventional channel is needed to lower the interference from the strong signal.

However, this is not true in the installed commercial optical network because there are many strong signals that can cause severe interference to the quantum channel in the current optical fiber communications network employing WDM transmission.

SUMMARY OF THE INVENTION

Generally, the present invention provides a communication system for quantum key distribution in which the quantum key distribution can be implemented in current commercial optical links by simply adding a wavelength for a quantum channel as quantum key distribution.

The present invention provides a method of quantum key distribution between a plurality of transmitting units and a plurality of receiving units over a wavelength division multiplexing (WDM) link, which comprises: 1) providing a plurality of WDM channels over the WDM link for coupling the transmitting units and the receiver units, respectively, the WDM channels comprising a plurality of quantum channels and a plurality of conventional channels; 2) assigning a different wavelength to each of the WDM channels; 3) transmitting single photon signals on each of the quantum channels; and 4) transmitting data on each of the conventional channels, the data comprising either conventional data or trigger signals for synchronizing the transmission of the single photon signals on the quantum channels.

In preferred embodiments of the invention, the wavelengths assigned to the WDM channels are at around 1,550 nm.

The present invention further provides a communication system for quantum key distribution at wavelengths around 1,550 nm over a wavelength division multiplexing (WDM) optical link, which comprises a plurality of transmitting units comprising a plurality of quantum transmitting units and a plurality of conventional transmitting units; a plurality of receiving units comprising a plurality of quantum receiving units and a plurality of conventional receiving units; and a WDM link linking the transmitting units to the receiving units. Moreover, the WDM link comprises a plurality of WDM channels, and the WDM channels may further comprise a plurality of quantum channels for communicating single photon signals between the quantum transmitting units and the quantum receiving units, respectively; and a plurality of conventional channels for communicating data between the conventional transmitting units and the conventional receiving units, respectively.

In some embodiments of the invention, the data transmitted on the conventional channels comprises either conventional data or trigger signals for synchronizing the transmission of the single photon signals on the quantum channels. Furthermore, each of the WDM channels is assigned a wavelength different from others so that the WDM channels are multiplexed in wavelengths over the WDM link.

According to an aspect of the present invention, it is possible to realize quantum key distribution between specific users (e.g. between a transmitter and a receiver) over a WDM link by using WDM technology. The transmitter may comprise one or more quantum transmitting units and one or more conventional transmitting units, the receiver may comprise one or more quantum receiving units corresponding to the one or more quantum transmitting units, respectively, and one or more conventional receiving units corresponding to the one or more conventional transmitting units, respectively. Moreover, the WDM link linking the transmitter and the receiver may comprise one or more quantum channels for communicating single photon signals between the one or more quantum transmitting units and the one or more quantum receiving units, respectively, and one or more conventional channels for communicating data between the one or more conventional transmitting units and the one or more conventional receiving units, and the data comprising either conventional data or trigger signals for synchronizing the transmission of the single photon signals on the quantum channels. Furthermore, each of the conventional channels and the quantum channels may be assigned a wavelength different from others so that the conventional channels and the quantum channels can be multiplexed in wavelengths over the WDM link.

According to another aspect of the present invention, the WDM link of the communication system may be a 3-channel WDM link, which comprises two quantum channels and a conventional channel. The data transmitted over the conventional channel may include trigger signals for synchronizing the quantum channels. Thus, the conventional channel can also serve as a trigger channel to synchronize the system. Each of the conventional channels and the quantum channels is assigned a wavelength different from others, and the conventional channel and the quantum channels are multiplexed by wavelength at around 1,550 nm over the WDM link, which is suitable for long-haul transmission.

Based on the WDM technology which combines many different wavelengths into a single optical fiber provided by the WDM link, the quantum key distribution is easily conducted in the current commercial fiber links by sharing a common fiber with conventional communication signals.

Moreover, a differential phase modulation technology is employed in the present invention to overcome an influence of temperature shifts and phase shifts on the system, which also makes the system stable.

DETAILED DESCRIPTION OF THE INVENTION

The present invention will be described in detail with reference to the drawings.

WDM is the key technology adopted in the present invention, which makes use of the parallel property of light to combine many different wavelengths into a single optical fiber. Thus it is possible to fulfill quantum key distribution over multi-user WDM network according to the present invention. By virtue of WDM, the system can establish simultaneously as many distinct secret keys as allowed by the number of wavelengths supported by the WDM network.

Figure 1:
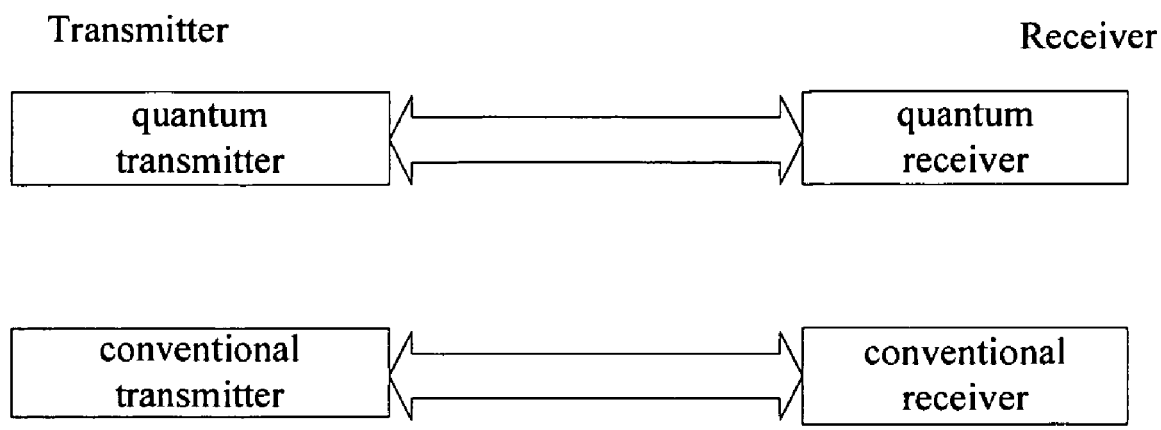
FIG. 1 shows a communication system for quantum key distribution in the prior art.
Figure 2:
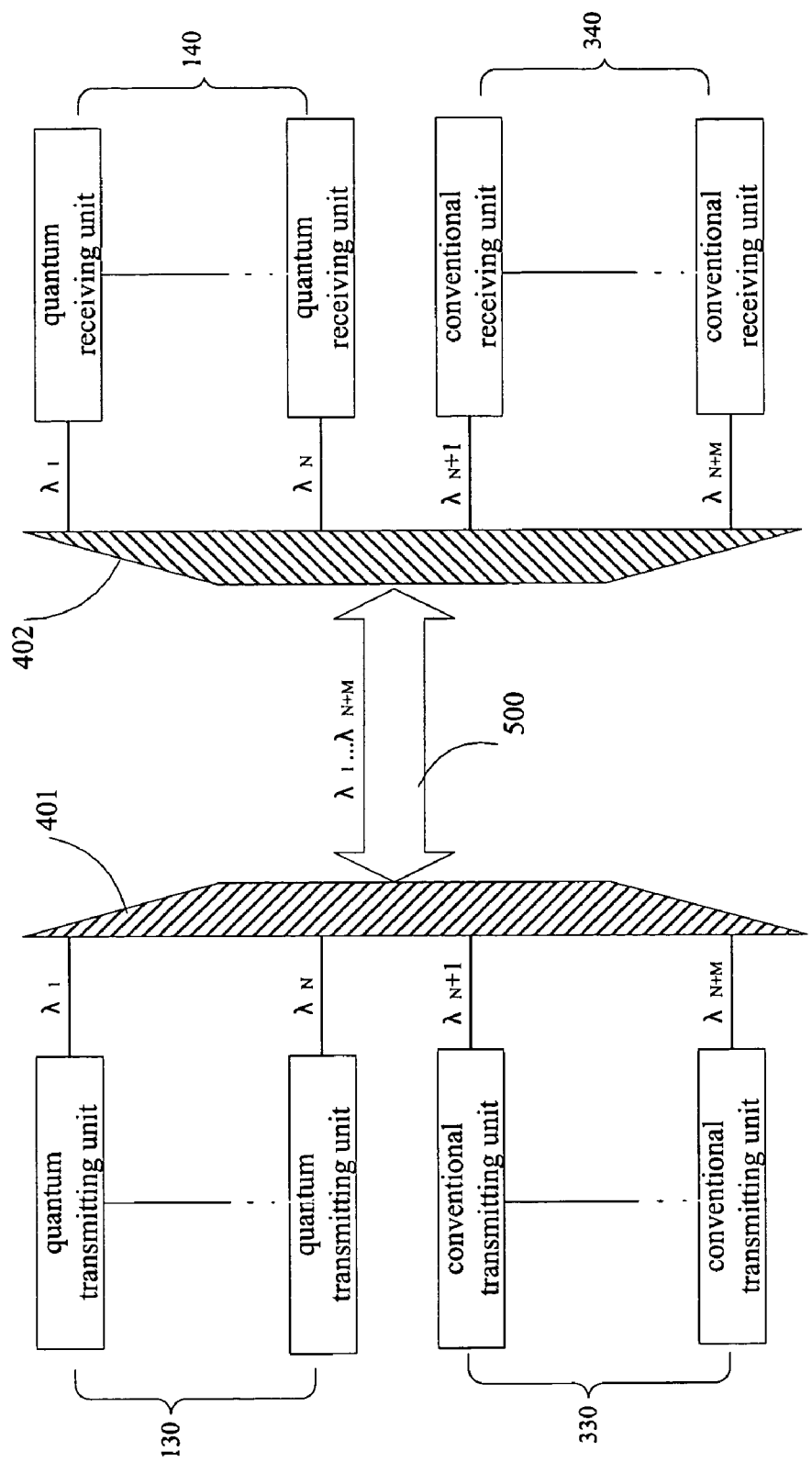
FIG. 2 shows a schematic view of a communication system for quantum key distribution over a multi-user WDM network according to the present invention.

For example, a communication system for quantum key distribution over multi-user WDM network according to one embodiment of the present invention is shown in FIG. 2. The communication system includes N quantum channels assigned with wavelengths from $\lambda_1$ to $\lambda_N$ for linking N quantum transmitting units 130 and N quantum receiving units 140 over a WDM link, and M conventional channels assigned with wavelengths from $\lambda_{N+1}$ to $\lambda_{N+M}$ for linking M conventional transmitting units 330 and M conventional receiving units 340 over the WDM link (where N and M are positive integers). The WDM link comprises array waveguide gratings (AWG) 402 and 401 and a single optical fiber 500. In the embodiment, the quantum channels and the conventional channels with distinct wavelengths (from $\lambda_1$ to $\lambda_{N+M}$) are multiplexed into the single optical fiber 500 by using the AWG 401 and the AWG 402. Thus, it is possible to realize quantum key distribution between specific quantum transmitting units and quantum receiving units by using WDM technology.

Figure 3:
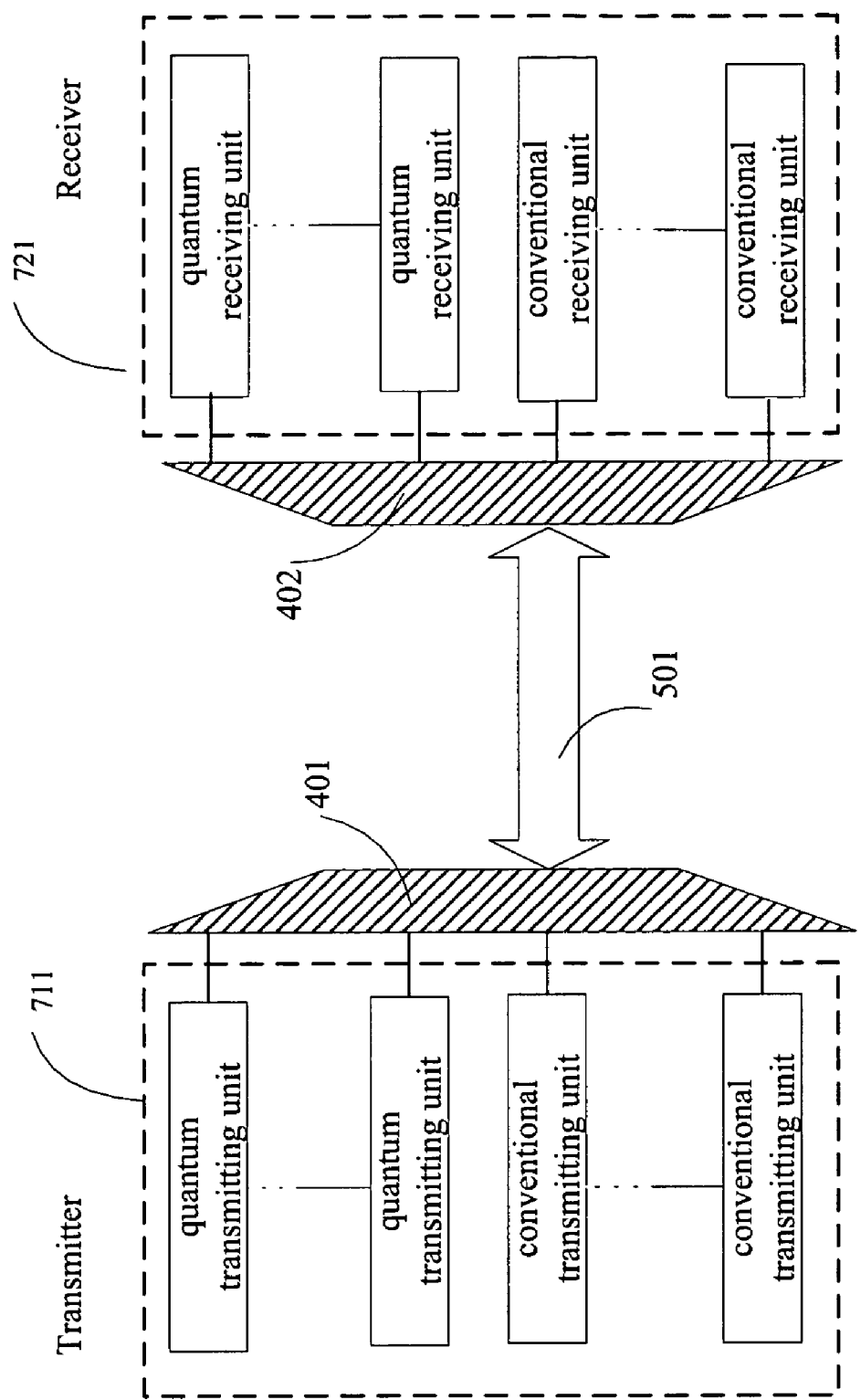
FIG. 3 shows a schematic view of quantum key distribution over a WDM link according to the present invention.

FIG. 3 shows an embodiment of quantum key distribution between specific users (e.g. between a transmitter and an intended receiver) among a plurality of users over a WDM link according to the present invention. As shown in the FIG. 3, the transmitter 711 has one or more quantum transmitting units and one or more conventional transmitting units, and the receiver 721 has one or more quantum receiving units, each of which corresponds to one of the one or more quantum transmitting units, respectively, and one or more conventional receiving units, each of which corresponds to one of the one or more conventional transmitting units.

The WDM link, linking the transmitter 711 and the receiver 721, comprises an AWG 401, an optical fiber 501 and another AWG 402. The WDM link is provided for multiplexing one or more quantum channels between the quantum transmitting units and the corresponding quantum receiving units for communicating single photon signals, and one or more conventional channels between the conventional transmitting units and the conventional receiving units for communicating data. In the embodiment, the data further includes trigger signals for synchronizing the transmission of the single photon signals on the quantum channels. Moreover, each of the conventional channels and the quantum channels is assigned a wavelength different from others, and the conventional channels and the quantum channels are multiplexed by wavelengths at around 1,550 nm over the WDM link.

Figure 4:
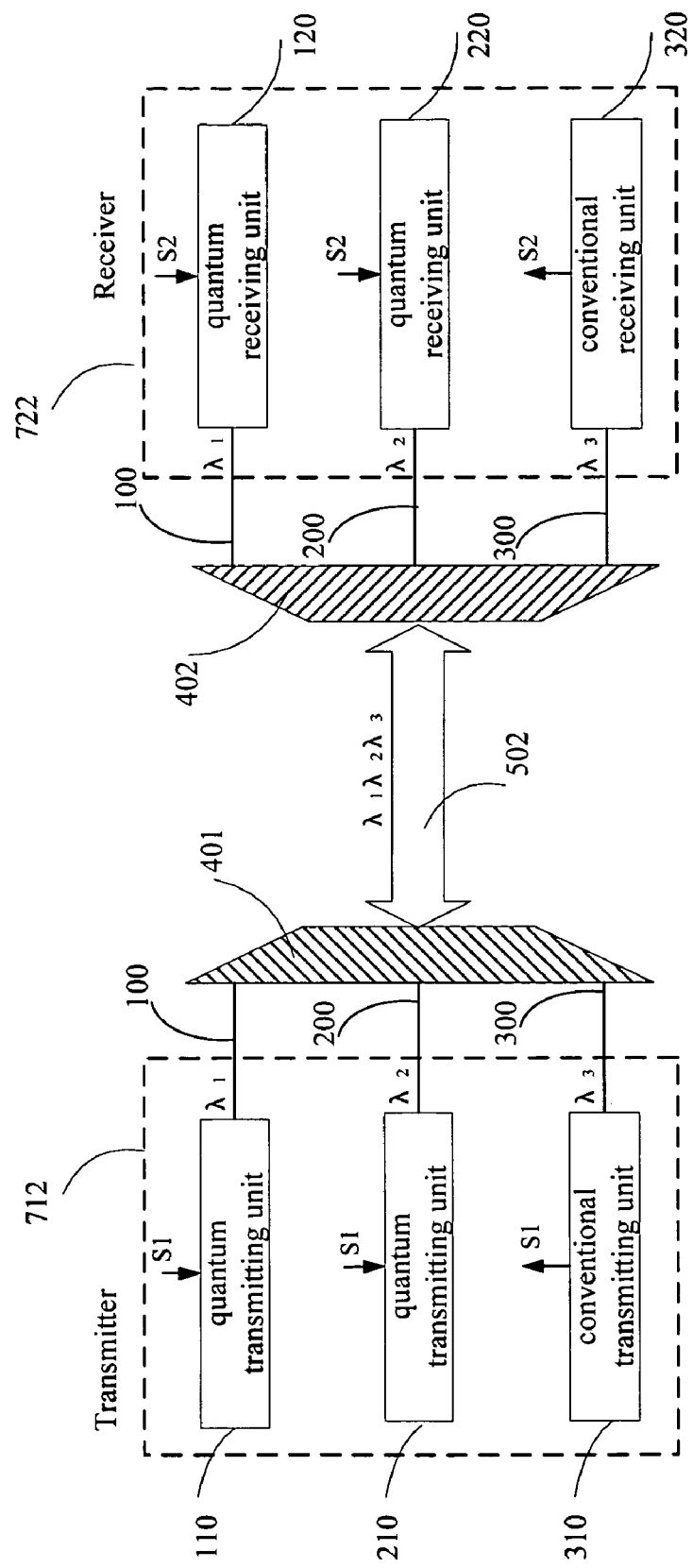
FIG. 4 shows a schematic view of an embodiment of quantum key distribution over a 3-channel WDM link according to the present invention.

FIG. 4 shows an embodiment of quantum key distribution between a transmitter and a receiver over a 3-channel WDM link. The transmitter 712 comprises a first quantum transmitting unit 110, a second quantum transmitting unit 210, and a conventional transmitting unit 310. The receiver 722 includes a first quantum receiving unit 120 corresponding to the first quantum transmitting unit 110, a second quantum receiving unit 220 corresponding to the second quantum transmitting unit 210, and a conventional receiving unit 320 corresponding to the conventional transmitting unit 310. The 3-channel WDM link comprises an AWG 401, an optical fiber 502 and another AWG 402, for multiplexing two quantum channels 100 and 200 and one conventional channel 300. The quantum channels 100 and 200 is provided between the two quantum transmitting units 110 and 210 and the two quantum receiving units 120 and 220 for transmitting single photon signals (quantum keys), respectively. The conventional channel 300 is provided between the conventional transmitting unit 310 and the conventional receiving unit 320 for transmitting data. In the embodiment, the data includes trigger signals S1 which is transmitted to the quantum transmitting units 110 and 210, and trigger signals S2 which is transmitted to the quantum receiving units 120 and 220, so as to synchronize the transmission of the single photon signals on the quantum channels 100 and 200. The two quantum channels 100 and 200 and the conventional channel 300 are assigned with different wavelengths, $\lambda_1$, $\lambda_2$ and $\lambda_3$, respectively, at around 1,550 nm which is compatible with the standard optical links.

In this manner, quantum key distribution can be conveniently implemented in the current commercial optical links by simply adding another wavelength thereto for the quantum channel as quantum key distribution. Furthermore, at the optical wavelength of 1,550 nm, the fiber losses are 0.2 dB/km, which translates into a large increase in transmission distance when compared with that at 1,300 nm at the same bit rate for a quantum cryptographic system.

The BB84 protocol can be employed in the quantum channels 100 and 200. In order to implement BB84 protocol, there must be four states in two non-orthogonal bases, each of which has two orthogonal states. For example, the four phases $\{0, \pi/2, \pi \text{ or } 3\pi/2\}$ can play the role of the four states. Moreover, $\{0, \pi\}$ corresponds to one basis that can be realized via choosing measurement basis phase shift 0. Similarly, $\{\pi/2, 3\pi/2\}$ is the other basis that corresponds to measurement choice of phase shift $\pi/2$. The four states can be expressed in the following, For "0", $|\text{'}0\text{'}\rangle = 1/\sqrt{2}(|0\rangle + |\pi/2\rangle)$ For "1", $|\text{'}1\text{'}\rangle = 1/\sqrt{2}(|\pi\rangle + |3\pi/2\rangle)$ From the wave functions, it is obvious that there is equal probability of 50% for phase shift 0 and $\pi/2$, respectively, for logic 0. So is logic 1.

Figure 5:
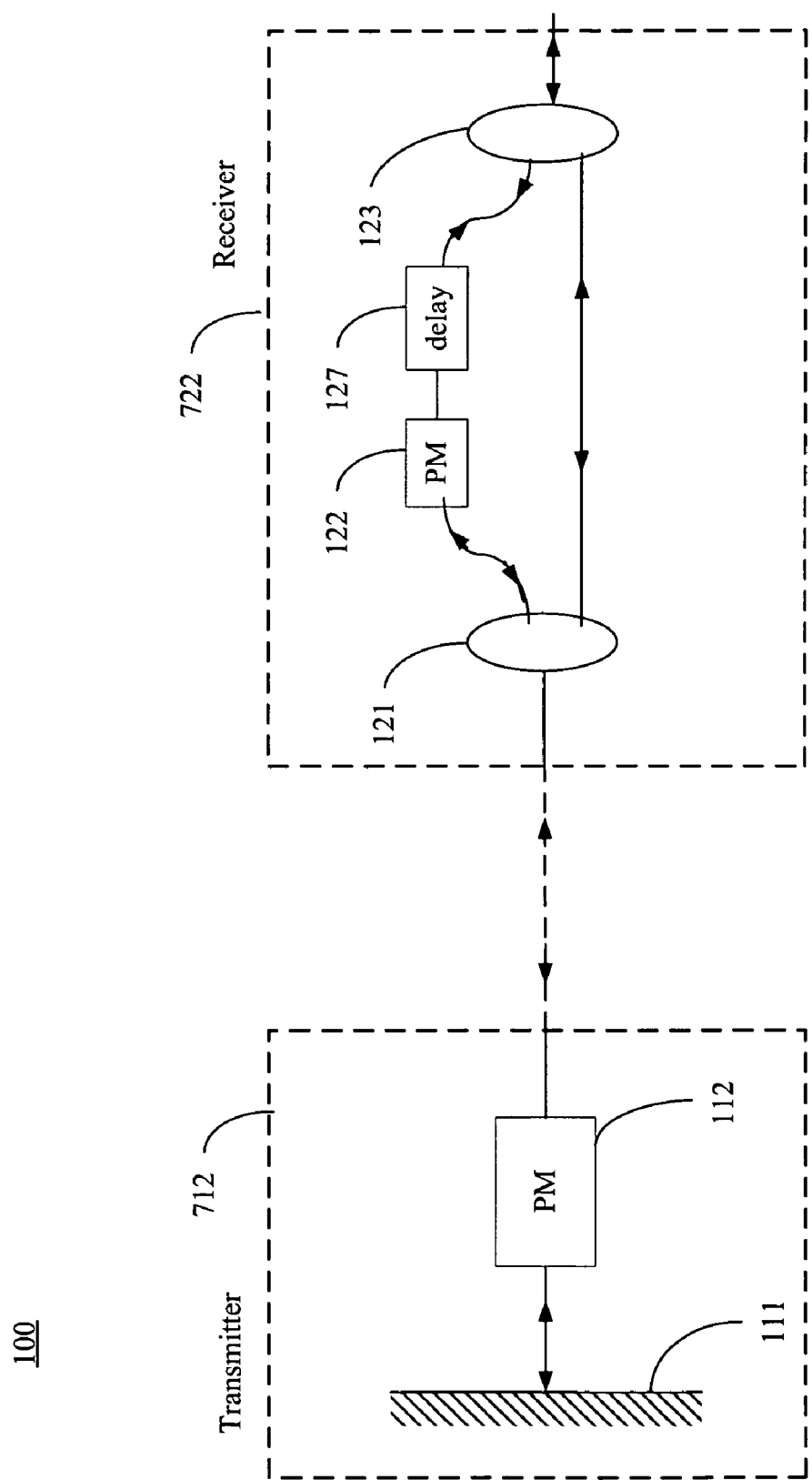
FIG. 5 shows an auto-compensation structure using a differential phase modulation technology employed in a quantum channel of the present invention.

An auto-compensation structure using a differential phase modulation technology is employed in the quantum channels of the present invention. As shown in FIG. 5, for example, in a quantum channel 100 (which is similar to a quantum channel 200), at the transmitter 712, a phase shift, $\Delta A$, provided by a phase modulator 112, is added to a first pulse in two neighboring pulses both of which travel from the receiver 722 to the transmitter 712. Another phase shift, $\Delta B$, provided by a phase modulator 122, at the receiver 722 will be also added to a second pulse when both the pulses return to the receiver side after being reflected by a Faraday rotating mirror 111. When the first pulse and the second pulse delayed by a delay means 127 arrive at a beam splitter 123, interference will happen, and the phase difference will be $\Delta A - \Delta B$. Therefore, only the phase difference has been retained. This arrangement enables the structure to compensate errors caused by temperature shifts, polarization changes and path variations experienced by the two pulses traveling in the interference section, because each of the two pulses, which will interfere at the receiver side of each quantum channel, experiences the same variations while traveling the same distance. Here we assume that another phase shift, $\delta$, caused by the temperature shift, polarization variation and distance variations, is put on both of the pulses in the same channel.

The phase shift, $\delta$, often changes at a different time for the variation by the factors mentioned above. However, it is nearly equal for the two neighboring pulses because they experience similar changes in the channel as those factors mentioned above vary relatively slowly within the time separation between the two neighboring pulses. For the first pulse, it has a phase shift, $\Delta A + \delta$, but there is a phase shift, $\delta + \Delta B$, for the second pulse. Hence, in the interfering section at the receiver side, the phase difference between the two returning pulses is $\Delta A - \Delta B$ because the phase shift, $\delta$, caused by the factors mentioned above will have been cancelled. Since the quantum channel 200 is similar to the quantum channel 100, the scheme of the quantum channels 100 and 200 of the present invention can overcome fluctuations caused by temperature, polarization and distance variations. Theoretically, it can obtain perfect interference in the scheme.

Figure 6A:
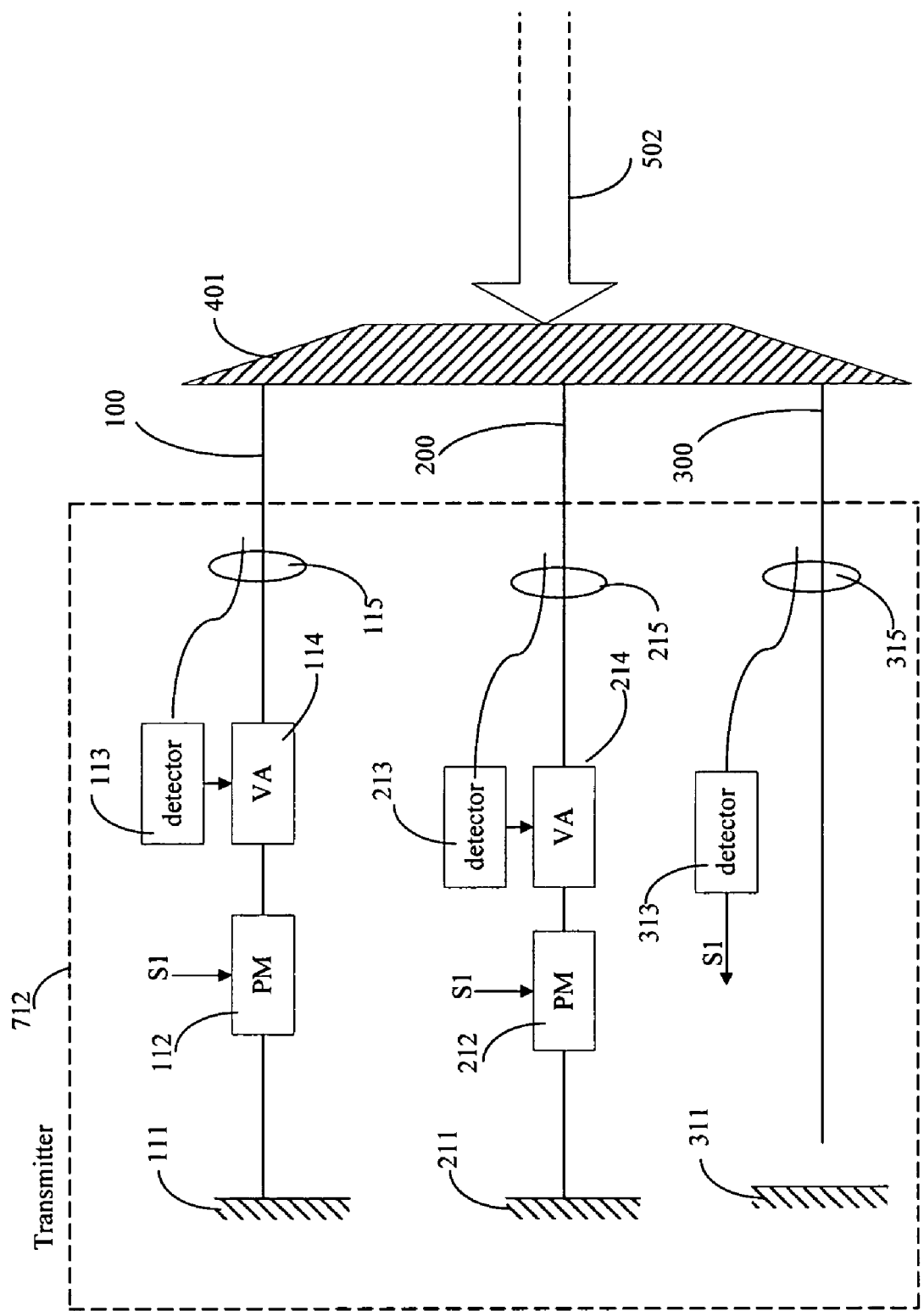
FIGS. 6a and 6b show a detailed structure of the quantum key distribution over the 3-channel WDM link as shown in FIG. 4.
Figure 6B:
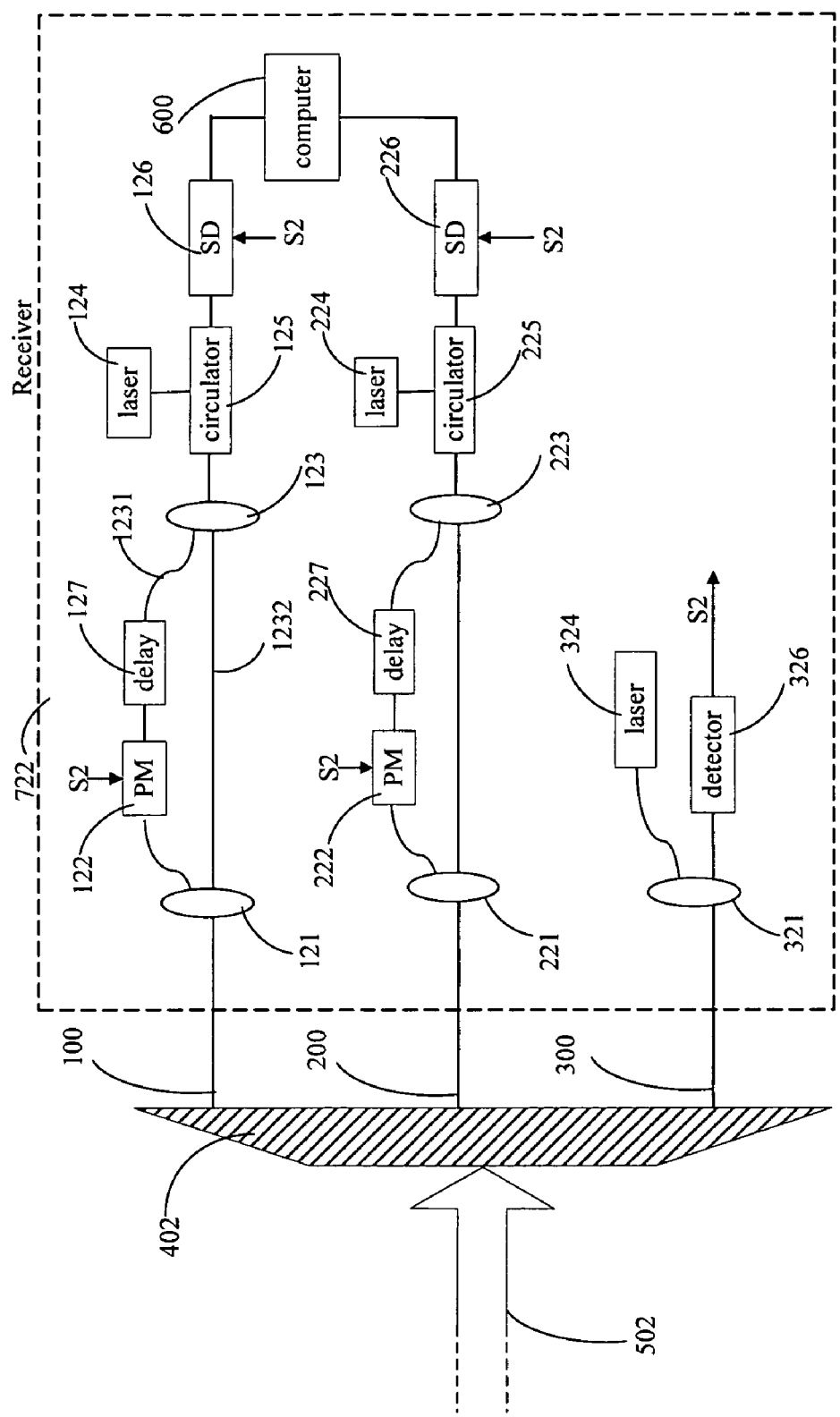

A detailed structure and principles of the quantum key distribution over a 3-channel WDM link are described with reference to FIGS. 6a and 6b.

In the quantum channel 100, at the receiver 722, a laser 124 launches a pulse string with power of 0 dBm into the WDM link via a circulator 125. Each pulse in the pulse string will be split into two pulses through a 50/50 beam splitter 123, a first pulse and a second pulse. The first pulse passes through an upper path 1231 with a delay of 26 ns set by a delay means 127 (e.g. a delay line of an optical fiber) before hitting a polarization beam splitter 121. A phase modulator 122 in the upper path 1231 is not used until a second pulse returns from the transmitter. A second pulse passes through a lower (shorter) path 1232 directly to the input port of the splitter 121.

After passing through the splitter 121, the two pulses with orthogonal polarizations and a delay of 26 ns between them are obtained. These two pulses then enter into an array waveguide grating (AWG) 402, propagate through a single-mode fiber 502 of e.g. 8.5 km, enter into another array waveguide grating (AWG) 401, and exit from the AWG 401 in channel 100 at the transmitter 712.

The pulses are again split by a 90/10 beam splitter 115, and the photons coming out from the 90 percent port of the splitter 115 are detected by a detector 113 for controlling a variable attenuator 114 to attenuate the returning pulses to obtain single-photon pulses. The two pulses coming out of the 10% port of the splitter 115 will pass through the attenuator 114 first without attenuation. They will then arrive at a Faraday mirror 111 through a phase modulator 112. The polarizations of the two pulses are rotated by 90° after they are reflected by the Faraday rotating mirror 111.

A random phase shift of $0, \pi/2, \pi$ or $3\pi/2$ generated by a random data signal generator (not shown) is then inserted into the first of the two return pulses by the phase modulator 112. The two return pulses are next attenuated to yield a single photon within a pulse when they pass through the attenuator 114 again. A trigger signal S1 generated from a detector 313 is used to synchronize with the phase modulator 112 to modulate the first return pulse from the Faraday mirror 111 and with an attenuation control signal from the detector 113 to attenuate both return pulses into single photons. Here the trigger signal S1 from the detector 313 should have an appropriate delay to synchronize the phase shift single from the data signal generator with the first return pulse. Also, the signal from detector 113 used to control attenuator 114 has an electrical delay in order to attenuate both light pulses when they pass through it in their return trip. Finally the two pulses return to the receiver 722 via opposite paths between the polarization beam splitter 121 and the beam splitter 123 after passing through the AWG 401, the 8.5 km standard single mode fiber 502 and the AWG 402. Hence, they can arrive at the beam splitter 123 at the same time and generate constructive or destructive interference at the beam splitter 123 to enable single photons to be detected by a single-photon detector 126.

The receiver 722 can randomly and independently select a measurement basis through setting a phase shift of 0 or $\pi/2$ in the phase modulator 122, which is synchronized by a trigger signal S2 derived from the pulse returning from the mirror 311 in the conventional data channel 300. The outcomes are stored in a computer 600. All fibers on receiver's side are polarization-maintaining fibers, which is necessary for the system to guarantee the polarizations of the two single photon pulses that will interfere are invariant after passing through the different paths of the interferometer.

A second quantum channel 200, similar to the quantum channel 100, comprises a Faraday mirror 211, a phase modulator 212, a detector 213, a variable attenuator 214, a 90/10 beam splitter 215, an AWG 401, a fiber 500, an AWG 402, a polarization beam splitter 221, a phase modulator 222, a beam splitter 223, a laser 224, a circulator 225, a single photon detector 226 and a delay means 227. For the reason that the configuration and principles of channel 200 is similar to the quantum channel 100, except that a time delay set by the delay means 227 of the quantum channel 200 is 21 ns and an independent measurement basis and random phase shifts that are independent of channel 100, the detailed description of the quantum channel 200 is omitted.

In the conventional channel 300, a common laser 324 emits a pulse with the power of 2 dBm into a 50/50 beam splitter 321, on receiver's side. The pulse then enters AWG 402 after passing the 50/50 beam splitter 321, travels in the 8.5 km single-mode fiber 500 and then through AWG 401, after which one-half of the pulse will be detected by a detector 313. The detected signal is used as a first trigger signal S1 to synchronize the phase modulators 112 and 212 with their respective pulses in quantum channels 100 and 200 through appropriate delays. The other half of the pulse will be reflected by a mirror 311 to return to the receiver, and will be detected by a detector 326 to generate a second trigger signal S2 to trigger the single photon detectors 126 and 226 to measure the interference of the quantum signals and to trigger the phase modulators 122 and 222 to select a measurement basis on the receiver's side, respectively.

The data communication channel 300 may also function as a regular optical communication channel which has high laser powers, e.g., 2 dBm emitted by the laser 324 in this embodiment. The wavelengths and the pulse widths of the three channels are listed in Table 1.

TABLE 1 wavelength and pulse width

|  | Channel | | |
| --- | --- | --- | --- |
|  | 100 | 200 | 300 |
| Wavelength (nm) | 1549.33 | 1551.18 | 1557.35 |
| Pulse width (ns) | 2.5 | 2.5 | 20 |

BB84 protocol has been implemented in this system. We use 100 kHz signals for phase modulation and synchronization. The pulse widths are 2.5 ns for quantum channels 100 and 200, and 20 ns for conventional channel 300, shown in Table 1. In order to reduce the crosstalk among the channels, especially between weak quantum channels 100 and 200, and the strong signal channel (the conventional channel 300), the wavelengths have to be arranged carefully. Here the spacing between quantum channel 100 and conventional channel 300 is about 8 nm, and that between quantum channel 200 and conventional channel 300 is about 6 nm.

The single photon detectors 126 and 226 are employed in the embodiment to measure the single photons. The dark count of the single photon detectors 126 and 226 is 40 Hz in the gated mode of 100 kHz with a measurement width of 2.5 ns, so the probability of measuring the dark count is $4.0 \times 10^{-4}$. The efficiency of the single photon detectors 126 and 226 is more than 10%. On the transmitter's side, the average photon count per pulse should be less than 0.1 in order to guarantee that a single photon is obtained in each pulse in the embodiment when the pulse passes through the variable attenuator 114 again. For an overall transmission loss of 17 dB, about 2% of single photons can be detected. On considering the 3 dB loss due to BB84 protocol, about 1% of single photons can be used for quantum key distribution theoretically.

TABLE 2

Experimental Results

|  | Channel | |
| --- | --- | --- |
|  | 100 | 200 |
| Key rate (kb/s) | 0.75 | 0.49 |
| Error probability (%) | 2.2 | 4.396 |

Experimentally, the count rate of the single photon detector 126 and 226 is 100 k counts/s and its efficiency is above 10%. In order to guarantee single photon in a pulse, the average photon count per pulse should be below 0.1 in the embodiment of the present invention. Therefore, count rate should be below 10 k/s at variable attenuators 114 and 214. According to the embodiment, the experimental count rate obtained is 7.67 k/s. After considering the transmission efficiency, error rate and detector efficiency, a 0.75 kbps quantum key has been obtained in channel 100, where the crosstalk causes an error probability of 2.2 percent, mostly derived from channel 300 and much less from channel 200 because the single photon signal in channel 200 is very weak. Similarly, in channel 200, the quantum key rate is 0.49 kbps and the crosstalk also causes an error probability of 4.396%. The crosstalk in channel 200 is larger than that in channel 100 because its wavelength is closer to that of the conventional communication channel than is the wavelength of channel 100.

While this invention has been described in conjunction with a few embodiments thereof, it will be understood for those skilled in the art to put this invention into practice in various other manners. It is appreciated that the scope of the invention is defined by the appended claims and should not be restricted by the description discussed in the summary and/or the detailed description of the preferred embodiments.

The invention claimed is:

1. A method of quantum key distribution, comprising:
 transmitting from a receiver via a conventional channel a light pulse for generating a first trigger signal for triggering a plurality of modulators at a transmitter;
 receiving at a plurality of quantum receivers a plurality of modulated single photon signals via a plurality of quantum channels, wherein the plurality of modulated single photon signals are indicative of quantum key information imposed by the plurality of modulators and wherein the conventional channel and the plurality of quantum channels are multiplexed in wavelengths; and
 receiving at the receiver via the conventional channel a reflected portion of the light pulse for generating a second trigger signal for triggering a plurality of modulators within the plurality of quantum receivers.

2. The method according to claim 1, wherein the plurality of quantum channels and the conventional channel are multiplexed in a WDM link.

3. The method according to claim 2, wherein the wavelengths assigned to the plurality of quantum channels and the conventional channel are at around 1,550 nm.

4. The method according to claim 3, wherein the wavelengths range from 1,475 nm to 1,590 nm.

5. The method according to claim 4, wherein the wavelength assigned to one of the plurality of quantum channels is at 1,549.33 nm or 1,551.18 nm, and the wavelength assigned to the conventional channel is at 1,557.35 nm.

6. The method according to claim 1, further comprising:
 generating an interference signal in response to at least one of the plurality of modulated single photon signals; and extracting the quantum key information by processing the interference signal.

7. The method according to claim 1, further comprising: initiating a first light pulse and a second light pulse; and transmitting via at least one of the plurality of quantum channels the first light pulse and the second light pulse for use by the transmitter for generating at least one of the plurality of modulated single photon signals.

8. The method according to claim 1, wherein at least one of the plurality of modulators within the plurality of quantum receivers is a differential phase modulator.

9. The method according to claim 1, wherein at least one of the plurality of quantum channels uses a BB84 protocol.

10. A communication system for quantum key distribution, comprising:
a receiving unit, configured for: (i) transmitting via a conventional channel a light pulse for generating a first trigger signal by a transmitter for triggering a plurality of transmitter modulators at the transmitter and for (ii) receiving via the conventional channel a reflected version of the light pulse for generating a second trigger signal for synchronizing a plurality of receiver modulators; and
a quantum receiving unit, comprising the plurality of receiver modulators, configured for receiving a plurality of modulated single photon signals via a plurality of quantum channels, wherein the plurality of modulated single photon signals are indicative of quantum key information and wherein the conventional channel and the plurality of quantum channels are multiplexed in wavelengths.

11. The communication system according to claim 10, further comprising an array waveguide grating for demultiplexing the plurality of quantum channels and the conventional channel.

12. The communication system according to claim 11, wherein at least one of the plurality of modulated single photon signals transmitted on the plurality of quantum channels is generated from a laser at a wavelength ranging from 1,475 nm to 1,590 nm.

13. The communication system according to claim 10, wherein the plurality of quantum channels and the conventional channel are multiplexed in a WDM link.

14. The communication system according to claim 11, wherein each of the plurality of receiver modulators applies a differential modulation to one of the plurality of the modulated single photon signals and wherein each of the plurality of receiver modulators comprises a short arm and a long arm.

15. The communication system according to claim 10, wherein the quantum receiving unit initiates a first light pulse and a second light pulse and transmits, via at least one of the plurality of quantum channels, the first light pulse and the second light pulse for use by the transmitter for generating at least one of the modulated single photon signals.

16. The communication system according to claim 10, wherein the receiving unit further includes a laser source for generating the light pulse.

17. The communication system according to claim 16, wherein the conventional receiving unit comprises a detector configured for detecting the reflected version of the light pulse and for generating the second trigger signal.

18. A method for quantum key distribution comprising:
transmitting, via a plurality of quantum channels, a plurality of modulated single photon signals, wherein each of the plurality of modulated single photon signals is indicative of quantum key information;
receiving, via a conventional channel, a light pulse for generating a first trigger signal for triggering the modulation of the plurality of modulated single photon signals, wherein the plurality of quantum channels and the conventional channel are multiplexed in wavelength; and
transmitting, via the conventional channel, a reflected portion of the light pulse for use by a receiver for generating a second trigger signal.

19. The method of claim 18, further comprising:
receiving a plurality of light pulses via the plurality of quantum channels;
modulating a reflected portion of the plurality of light pulses received via the plurality of quantum channels in response to the first trigger signal; and
generating the plurality of modulated single photon signals by attenuating the modulated plurality of light pulses.

20. A communication system for quantum key distribution comprising:
a quantum transmitting unit configured for transmitting, via a plurality of quantum channels, a plurality of modulated single photon signals, wherein the plurality of modulated single photon signals is indicative of quantum key information; and
a transmitting unit configured for: receiving, via a conventional channel, a light pulse and responsively generating a first trigger signal for triggering the modulation of the plurality of modulated single photon signals, wherein the quantum channel and the conventional channel are multiplexed in wavelength and for transmitting, via the conventional channel, a reflected portion of the light pulse for use by a receiver for generating a second trigger signal.

21. The communication system of claim 20,
wherein the transmitting unit further comprises:
a detector for detecting a portion of the light pulse and responsively generating the first trigger signal; and
a Faraday mirror for generating the reflected portion of the light pulse.

22. The communication system of claim 20, wherein the quantum transmitting unit receives via the plurality of quantum channels a plurality of light pulses, and wherein the quantum transmitting unit further comprises phase modulators for modulating a portion of the plurality of light pulses in response to the first trigger signal and variable attenuators for attenuating the modulated portion of the plurality of light pulses to generate the plurality of modulated single photon signals.

23. The communication system of claim 20, further comprising an array waveguide grating for multiplexing the plurality of quantum channels and the conventional channel.

* * * * *

UNITED STATES PATENT AND TRADEMARK OFFICE
CERTIFICATE OF CORRECTION

PATENT NO. : 7,639,947 B2
APPLICATION NO. : 11/231084
DATED : December 29, 2009
INVENTOR(S) : Luo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this

Twenty-eighth Day of September, 2010

David J. Kappos
*Director of the United States Patent and Trademark Office*